(12) United States Patent
Boggs et al.

(10) Patent No.: US 6,912,329 B1
(45) Date of Patent: Jun. 28, 2005

(54) FIBER COLOR DETECTOR METHOD AND APPARATUS

(75) Inventors: Patricia J. Boggs, Conyers, GA (US); Hossein Eslambolchi, Los Altos Hills, CA (US); John Sinclair Huffman, Conyers, GA (US); James F. Kirkpatrick, Conyers, GA (US)

(73) Assignee: AT&T Corp., New York, NY (US)

( * ) Notice: Subject to any disclaimer, the term of this patent is extended or adjusted under 35 U.S.C. 154(b) by 4 days.

(21) Appl. No.: 10/273,793

(22) Filed: Oct. 18, 2002

(51) Int. Cl.[7] ................................................ G02B 6/00
(52) U.S. Cl. ................................. 385/12; 250/227.11
(58) Field of Search ........................... 385/12, 31, 33, 385/901; 250/227.11

(56) References Cited

U.S. PATENT DOCUMENTS 4,094,598 A * 6/1978 Hodges ....................... 353/76
4,391,516 A * 7/1983 Boggs et al. ............... 356/73.1
4,550,515 A * 11/1985 Simmons ...................... 40/362
6,217,233 B1 * 4/2001 Eslambolchi et al. ......... 385/95

* cited by examiner

Primary Examiner—Phuong Dinh

(57) ABSTRACT

A fiber color detector is presented. A magnifying glass and a receptacle are formed in a housing. In addition, a platform including a first side facing the magnifying glass and a second oppositely disposed side is located within the housing. A light source located within the housing is positioned relative to the second side of the platform and radiates light, which emanates through the platform. A fiber is inserted into the receptacle and is positioned between the first side of the platform and the magnifying glass. As such, when the light source generates light, which emanates through the platform, the color of the fiber is contrasted against the color of the platform, when viewed through the magnifying glass. As such, an operator may view and detect the color of the fiber through the magnifying glass.

12 Claims, 1 Drawing Sheet

FIBER COLOR DETECTOR METHOD AND APPARATUS

BACKGROUND OF THE INVENTION

1. Field of the Invention

This invention relates to cable maintenance. Specifically, the present invention relates to fiber detection.

2. Description of the Prior Art

In modern utility companies personnel is assigned to design and maintain the utility infrastructure. The personnel is typically referred to as operations personnel. For example, in power utility companies or in communication utility companies operations personnel typically maintain the utility system.

Most utility infrastructure utilizes cables. For example, both power companies and communication companies use cables to communicate the resources that they provide to customers. The cabling may be copper cabling, fiber-optic cabling or coaxial cabling.

Most of the cabling is buried so that the cabling will not be disturbed. For example, in communication systems, fiber-optic cabling is typically buried so that the cabling is not disrupted or disturbed. The cabling is typically buried in a subterranean area where the lighting is very poor. Therefore, when operations personnel attempt to gain access and troubleshoot the cabling, it is typically hard to distinguish or see the cabling. To compound matters, several fibers within the cable are typically bundled together. Therefore, since the lighting in the area is poor, it is hard to distinguish a single fiber from the many fibers that are collocated within the cable of interest. In addition, fibers have a very small diameter, which further exacerbates the problem of identifying a single fiber.

Fibers are identified by color code in binder groups within the fiber cable. Various standards have been developed to identify individual fibers. For example, blue=1, orange=2, green=3, brown=4, slate=5, white=6, red=7, black=8, yellow=9, violet=10, aqua=11 and rose=12 are standardized color codes within the communication industry. Using the color code an operator knows which fibers to reconnect after splicing the fibers for maintenance. However, when there is poor lighting, it becomes difficult for an operator to distinguish the fiber color. As a result, when an operator attempts to work on a cable in an area with poor lighting, there is a high risk of reconnecting the wrong fibers. Reconnecting the wrong fibers results in connection of the wrong endpoints, which may ultimately result in extended service outage.

Thus, there is a need for a method and apparatus for identifying fibers in areas with poor lighting. There is a need for a method and apparatus to distinguish a fiber given the size of fibers. There is a need for a method and apparatus for distinguishing a single fiber from the other fibers that are collocated within the cable of interest.

SUMMARY OF THE INVENTION

A fiber color detector is presented. The fiber color detector comprises a housing including a magnifying glass and a receptacle; a platform located within the housing includes a first side and an oppositely disposed second side, wherein the platform is positioned such that a fiber inserted in the receptacle will be positioned between the magnifying glass and the first side of the platform; and a light source generating light, wherein the light source is positioned within the housing and relative to the second side of the platform such that the light emanating from the light source will pass through the platform and illuminate the fiber inserted in the receptacle with the platform as a background, when viewed through the magnifying glass.

A method of detecting a fiber color comprises the steps of inserting a fiber including a color in a detector unit, the detector unit comprising a housing including a magnifying glass and a receptacle; a platform located within the housing and including a first side and an oppositely disposed second side, the platform is positioned such that the fiber inserted in the receptacle will be positioned between the magnifying glass and the first side of the platform; and a light source generating light, the light source is positioned relative to the second side of the platform such that the light emanating from the light source will illuminate the fiber inserted in the receptacle against the platform; and detecting the fiber color through the magnifying glass.

A method of detecting a fiber color comprising the steps of inserting a fiber including a color in a housing including a platform and a magnifying glass; viewing the fiber against the platform through the magnifying glass; replacing the platform with a new fiber; and detecting the color of the fiber by viewing the fiber against the new platform, through the magnifying glass.

DESCRIPTION OF THE INVENTION

Figure 1:
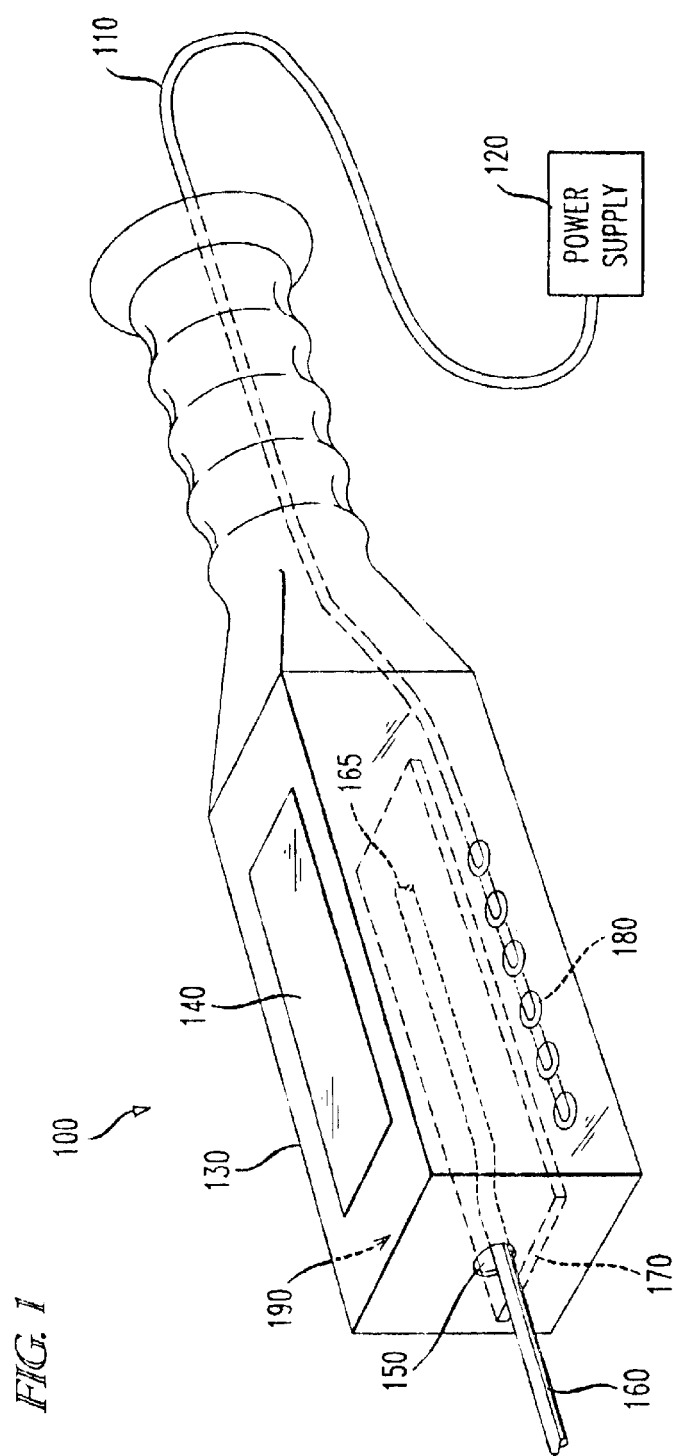
FIG. 1 displays a diagram of one embodiment of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A method and apparatus for detecting the color of a fiber is presented. FIG. 1 displays one embodiment of the present invention. A fiber color detector 100 is shown. The fiber color detector 100 is connected to a power supply 120 through a power cord 110.

The fiber color detector 100 includes a housing 130 for retaining the components of the fiber color detector 100. The housing 130 includes a magnifying glass 140 and a receptacle opening 150. A platform 170 and light source 180 are also shown.

In one embodiment of the fiber color detector 100, the housing 130 may take a rectangular form. However, other forms such as a trapezoidal form, spherical form, etc. are also contemplated and within the scope of the present invention. The housing 130 may be compact enough to be held in the palm of a human hand or the housing 130 may be larger such that it has to be placed on a support. The housing 130 may be made of a variety of materials including light weight metal, plastic or another durable composite material. Lastly, the housing 130 may include a hinge and latching mechanisms (not shown), so that components in the housing 130 may be easily removed and exchanged.

A magnifying glass 140 is positioned in the top of the housing 130. The magnifying glass 140 may take a variety of shapes, such as a rectangular shape, a circular shape, etc. The magnifying glass 140 may be fused into the body of the housing 130 or the magnifying glass 140 may be a removable piece so that magnifying glasses of varying strength may be inserted in the housing 130.

A receptacle opening 150 is formed in the housing 130. The receptacle opening 150 is formed as a circular opening to match the form of a fiber 160 that will be inserted in the receptacle opening 150. In one embodiment of the present invention, the receptacle opening 150 may be positioned at a 90-degree angle to the magnifying glass 140 in a different wall of the housing 130. However, it should be appreciated that the receptacle opening 150 may be positioned at various angels to the magnifying glass 140. In another embodiment of the present invention, the receptacle opening 150 may be positioned in the same wall of the housing 130 as the magnifying glass 140 or on a different wall of the housing 130. The receptacle opening 150 is positioned so that when a fiber 160 is inserted into the housing 130, the fiber 160 will align with the magnifying glass 140 as shown by 165 (e.g., inserted fiber). It should be appreciated that the receptacle opening 150 may be of varying shapes and sizes and still remain within the scope of the present invention.

A platform 170 is enclosed in the housing 130. In one embodiment of the present invention, the platform 170 is positioned so that the platform 170 is aligned with the magnifying glass 140. As such, when an inserted fiber 165 is positioned in the housing 130 through the receptacle opening 150, the platform 170, the inserted fiber 165 and the magnifying glass 140 all align so that the platform 170 provides a background for the inserted fiber 165 when viewing the inserted fiber 165 through the magnifying glass 140. The platform 170 may be made of a lightweight, transparent or nearly transparent material. In addition, in one embodiment of the present invention, the platform 170 is colored to contrast the color of the inserted fiber 165. For example, the platform 170 colors, are selected to provide a contrasting background, when placed against the standard color fibers implemented in the communications industry (e.g., blue=1, orange=2, green=3, brown=4, slate=5, white=6, red=7, black=8, yellow=9, violet=10, aqua=11 and rose=12). As such, the color of the inserted fiber 165 may be easily distinguished by the human eye or some other color detecting mechanism, when observed through the magnifying glass 140. In another embodiment of the present invention, the platform 170 may be removed and replaced to provide an appropriately colored platform, which allows an operator to easily distinguish the inserted fiber 165 against the platform 170.

A light source 180 is positioned within the housing 130 on an oppositely disposed side of the platform 170 from the inserted fiber 165. The light source 180 is positioned to radiate light upward through and around the platform 170 so that the inserted fiber 165 may be easily distinguished when viewed through the magnifying glass 140. In one embodiment of the present invention, the light source 180 may be a halogen lamp or some other type of light source. In another embodiment of the present invention, the light source 180 may include any type of light source 180 that generates white light, so that the color of the fibers 160 can be detected. In addition, the inside of the housing 190 may be coated with a reflective material so that as light emanates from the light source 180, the light is further reflected within the body of the housing 130 and up to the magnifying glass 140. Additional formations such as different angular formations, cylindrical or cone shaped formations may be used inside of the housing 130 to further enhance the reflection of the light. Therefore, in one embodiment of the present invention, the housing 130 may take a rectangular or square form and the inside of the housing 190 may take a cylindrical form, which enhances the reflection of the light emanating from the light source 180. It should be appreciated that the external shape of the housing 130 and the inside of the housing 190 may be shaped differently. It should also be appreciated that the external shape of the housing 130 and the inside of the housing 190 may be shaped relative to each other so that the light emanating from the light source 180 is maximized and the inserted fiber 165 may be more clearly distinguished when viewed through the magnifying glass 140.

A power supply 120 is connected to the housing 130 through a power cord 110. In one embodiment of the present invention, the power supply 120 is used to provide power to the light source 180. However, it should be appreciated that the light source 180 may be powered by electricity or powered by the power supply 120.

During operation of the fiber color detector of FIG. 1, an operator initially identifies a cable for analysis. The operator may splice the cable and a fiber within the cable to expose the fiber for further analysis. The spliced fiber is inserted in the fiber color detector 100 through the receptacle opening 150. The inserted fiber 165 is input into the housing 130 and positioned to rest on the platform 170. The light source 180 may be turned on prior to placing the inserted fiber 165 in the housing 130 or after placing the inserted fiber 165 in the housing 130. The light source 180 generates light, which emanates through the platform 170 and in the inside of the housing 190. The light illuminates the area around the inserted fiber 165. In addition, since the color of the platform 170 is chosen to highlight the fiber color, the contrast of the inserted fiber 165 will be visible against the platform 170, which serves as a background for the inserted fiber 165. As such, an operator may look through the magnifying glass 140 and detect the color of the inserted fiber 165, which will be in contrast to the color of the platform 170 and illuminated by the light source 180. Since the inserted fiber 165 has a small diameter, the magnifying ability of the magnifying glass 140 will further enable detection of the color of the inserted fiber 165 against the background of the platform's color. In addition, the magnifying glass 140 serves to magnify the light emanating from the light source 180, which enhances color detection.

In another embodiment of the present invention, several platforms will be used to detect the color of the fiber 160. Using a trial and error approach, a platform 170 will be inserted to provide a background and to enable an operator to distinguish the color of the inserted fiber 165. If the operator is unable to distinguish the color of the inserted fiber 165, the platform 170 will be exchanged with a new platform 170 of a different color. This process will continue until a platform 170 is inserted that enables an operator to distinguish the color of the inserted fiber 165.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is, therefore, intended by the appended claims to cover any and all such applications, modifications and embodiments within the scope of the present invention.

What is claimed is:

1. A fiber color detector, comprising:
   a housing including a magnifying glass and a receptacle opening defined in the housing for receiving a length of fiber within the housing, the housing being sized and arranged to be supported by an operator's hand;

a platform located within the housing and including a first side and an oppositely disposed second side, the platform being positioned such that a fiber inserted through the receptacle opening will be positioned between the magnifying glass and the first side of the platform; and a light source for generating light, the light source being positioned within the housing and relative to the second side of the platform such that the light emanating from the light source will illuminate the length of fiber inserted through the receptacle opening between the magnifying glass and the platform.

2. A fiber detector as set forth in claim 1, wherein the platform is a color platform.

3. A fiber detector as set forth in claim 1, wherein the light source is a halogen light source.

4. A fiber detector as set forth in claim 1, wherein the platform is a nearly transparent platform and light emanates through the platform to illuminate the fiber.

5. A fiber detector as set forth in claim 1, wherein the housing further includes a first wall and a second wall and wherein the magnifying glass is positioned in the first wall of the housing and the receptacle is positioned in the second wall of the housing.

6. A fiber detector as set forth in claim 1, wherein the housing is a rectangular housing.

7. A fiber detector as set forth in claim 1, wherein the platform is aligned in parallel with the magnifying glass.

8. A fiber detector as set forth in claim 1, wherein the magnifying glass is formed in the housing.

9. A fiber detector as set forth in claim 1, wherein the magnifying glass is a removable magnifying glass.

10. A fiber detector as set forth in claim 1, wherein the platform is formed in the housing.

11. A fiber detector as set forth in claim 1, wherein the platform is a removable platform.

12. A fiber color detector comprising:

a housing means including a magnifying means for magnifying a viewing area within the housing and a receptacle opening means defined in the housing means for receiving a length of fiber within the housing means, the housing means being sized and arranged to be supported by an operator's hand;

a platform means for providing a background behind the length of fiber located within the housing means and including a first side and an oppositely disposed second side, the platform means being positioned such that a fiber inserted through the receptacle opening means will be positioned between the magnifying means and the first side of the platform means; and a light means for generating light, the light means being positioned relative to the second side of the platform means such that the light emanating from the light means will illuminate the length of fiber inserted through the receptacle opening means between the magnifying means and the platform means.

* * * * *